United States Patent
Koelle et al.

(10) Patent No.: US 6,744,240 B2
(45) Date of Patent: Jun. 1, 2004

(54) METHOD FOR IMPROVING THE EFFICIENCY OF AN ELECTRICAL MACHINE

(75) Inventors: Gerhard Koelle, Wiernsheim (DE); Kurt Reutlinger, Stuttgart (DE); Begir Pushkolli, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/031,880

(22) PCT Filed: May 9, 2001

(86) PCT No.: PCT/DE01/01764
§ 371 (c)(1),
(2), (4) Date: Jan. 25, 2002

(87) PCT Pub. No.: WO01/95476
PCT Pub. Date: Dec. 13, 2001

(65) Prior Publication Data
US 2003/0006739 A1 Jan. 9, 2003

(51) Int. Cl.[7] .......................... H02H 7/06; H02P 11/00; H02P 9/00
(52) U.S. Cl. ............................................ 322/20; 322/17
(58) Field of Search ...................... 322/17, 20

(56) References Cited

U.S. PATENT DOCUMENTS

| | | | | | |
|---|---|---|---|---|---|
| 3,809,040 | A | * | 5/1974 | Burson et al. | 123/406.57 |
| 3,916,284 | A | * | 10/1975 | Hilgendorf | 363/10 |
| 4,045,718 | A | * | 8/1977 | Gray | 320/123 |
| 4,141,425 | A | * | 2/1979 | Treat | 180/2.2 |
| 4,239,978 | A | * | 12/1980 | Kofink | 307/16 |
| 4,246,531 | A | * | 1/1981 | Jordan | 322/28 |
| 4,672,291 | A | * | 6/1987 | Rosenberg | 318/823 |
| 4,677,365 | A | * | 6/1987 | Yang | 322/90 |
| 4,825,139 | A | * | 4/1989 | Hamelin et al. | 322/90 |
| 4,973,896 | A | * | 11/1990 | Shiga et al. | 322/28 |
| 5,231,344 | A | * | 7/1993 | Marumoto et al. | 322/14 |
| 5,625,276 | A | * | 4/1997 | Scott et al. | 322/24 |
| 5,771,475 | A | * | 6/1998 | Tabata et al. | 701/22 |
| 5,880,533 | A | * | 3/1999 | Arai et al. | 290/31 |
| 6,023,135 | A | * | 2/2000 | Gilbreth et al. | 318/140 |
| 6,158,405 | A | * | 12/2000 | Masberg et al. | 123/192.1 |
| 6,577,087 | B2 | * | 6/2003 | Su | 318/254 |
| 6,600,240 | B2 | * | 7/2003 | Mikhail et al. | 307/85 |
| 6,639,328 | B2 | * | 10/2003 | Wacknov | 290/52 |

FOREIGN PATENT DOCUMENTS

| | | |
|---|---|---|
| DE | 22 31 576 A | 1/1974 |
| EP | 0 762 596 A | 3/1997 |
| JP | 62 007340 A | 1/1987 |

OTHER PUBLICATIONS

Patent Abstracts of Japan vol. 007, No. 062 (E–164), Mar. 15, 1983 & JP 57 208849 A, Dec. 22, 1982.
Patent Abstracts of Japan vol. 1997, No. 02, Feb. 28, 1997 & JP 08 280162 A, Oct. 22, 1996.
Patent Abstracts of Japan vol. 018, No. 378 (E01579), Jul. 15, 1994 & JP 06 105512 A, Apr. 15, 1994.
Patent Abstracts of Japan vol. 017, No. 549 (E–1443), Oct. 4, 1993 & JP 05 153799 A, Jun. 18, 1993.
Patent Abstracts of Japan vol. 1995, No. 01, Feb. 28, 1995 & JP 06 292329 A, Oct. 18, 1994.

* cited by examiner

*Primary Examiner*—Burton S. Mullins
*Assistant Examiner*—Pedro J. Cuevas
(74) *Attorney, Agent, or Firm*—Michael J. Striker

(57) ABSTRACT

A method for operating an electrical machine (1) for the production of electrical power (13) includes an excitation winding (2) and a stator winding (4). A converter configuration (6), e.g., a pulse-width modulation inverter, is located downstream from the electrical machine (1). In the lower speed range, the output of electrical power (12) takes place along the torque line (29) independently of the number of coils $w_1$, $w_2$ in a stator winding (4). In the upper speed range, the output of electrical power (12) takes place via a stator winding (4) having a small number of coils $w_2$.

7 Claims, 2 Drawing Sheets

METHOD FOR IMPROVING THE EFFICIENCY OF AN ELECTRICAL MACHINE

BACKGROUND OF THE INVENTION

In the development of motor vehicles having lower fuel consumption, an increasing amount of attention is paid to the portion of fuel consumption caused by the electrical components in motor vehicles. It is assumed that the additional fuel consumed to generate 100 W of electrical power is in the magnitude of 0.1 to 0.15 l of fuel per 100 km driving distance. It follows that electrical machines used in the motor vehicle, e.g., a generator, are required to output electrical power with optimal efficiency.

RELATED ART

Today, the generation of electrical power in motor vehicles usually takes place using claw-pole alternators. These alternating-current machines are connected to the vehicle electrical system—which is a direct-voltage network—via a passive diode rectifier bridge. The generators used to produce electrical energy in motor vehicles are dimensioned so that they can deliver the electrical power required to supply the electrical components even when the engine is idling.

In order to meet the expected increase in demand for making electrical power available in motor vehicles in the future as well, alternators, such as a claw-pole alternator, can be outfitted with pulse-width modulation inverters. Using these components, the output of the alternator can be increased considerably, especially in its lower speed range.

Today, alternators are usually dimensioned in such a fashion that, together with the diode rectifiers, they already start outputting electrical power below the idle speed of an internal combustion engine. The speed at which the generator reaches a terminal voltage of 14 V with full excitation is in the magnitude of 1000 to 1200 $min^{-1}$. During idle (at a generator speed of approximately 1800 $min^{-1}$), the power output reaches a tangent point of the power curve. At this operation point of the alternator, the output of electrical power reaches approximately 60 to 70% of its maximum value. The tangent point mentioned is usually set in the engine idle of the internal combustion engine. The electrical machine is most efficient at the tangent point.

The maximum value of the output of electrical power that occurs is reached at a generator speed of approximately 6000 $min^{-1}$ and increases practically no further at higher speeds.

Although this dimensioning of an electrical machine working in the generator mode results in a very good compromise between size and the requirement that electrical power be completely covered, even when the internal combustion engine of a motor vehicle is idling, the electrical machine operates within a very high speed range close to its short-circuiting point to output maximum electrical power. As a result, the stator copper losses that occur are considerable.

SUMMARY OF THE INVENTION

The operation of an electrical generator having allocated pulse-width modulation inverter allows the number of stator windings on the stator of the generator to be designed according to design criteria other than the inception speed of the generator at which the output of electrical power sets in. By means of the pulse-width modulation inverter allocated to the electrical machine, the power output of the electrical machine can be directed along the torque line in the lower speed range, independently of the number of coils in the stator winding of the generator. By means of the operating mode of the electrical machine with downstream-installed pulse-width modulation inverter, the inception speed at which the electrical machine outputs electrical power can be reduced so far that sufficient electrical power can be output even when an internal combustion engine is idling. By operating the electrical machine using pulse-width modulation inverters, therefore, sufficient electrical power is available, even at low internal combustion engine speeds. It is no longer necessary to rely on the terminal voltage of the machine exceeding the nominal voltage.

If the pulse-width modulation inverter is operated using an electrical machine, the stator winding of which comprises a smaller number of coils, the following advantages can be attained in the upper speed range:

On the one hand, in the upper speed range, either the output of the electrical machine can be increased, or its efficiency can be significantly enhanced. In electrical machines having a small number of coils, compared to electrical machines having a larger number of coils—with electrical output the same—a lower slot electrical loading is attained with the electrical machine having a smaller number of stator windings. Assuming a slot space factor that is equal for the electrical machine having a larger number of coils and for the electrical machine having a smaller number of coils, markedly fewer losses in the winding copper occur in the electrical machines having a smaller number of coils. Moreover, the losses occurring in the iron caused by the slot electrical loading are also reduced (harmonic losses). The machine winding of the electrical machine is therefore able to be dimensioned for minimal total losses in one driving schedule.

Using the means proposed according to the invention for attaining the object of the invention, i.e., to operate an electrical machine having a small number of coils using a pulse-width modulation inverter, the performance of these electrical machines can be fully utilized in the upper speed range. As a result, there is a power reserve available in terms of making electrical power available.

BRIEF DESCRIPTION OF THE DRAWINGS

The invention is described in greater detail hereinafter using the drawing.

DETAILED DESCRIPTION OF THE PREFERRED EMBODIMENTS

Figure 1:
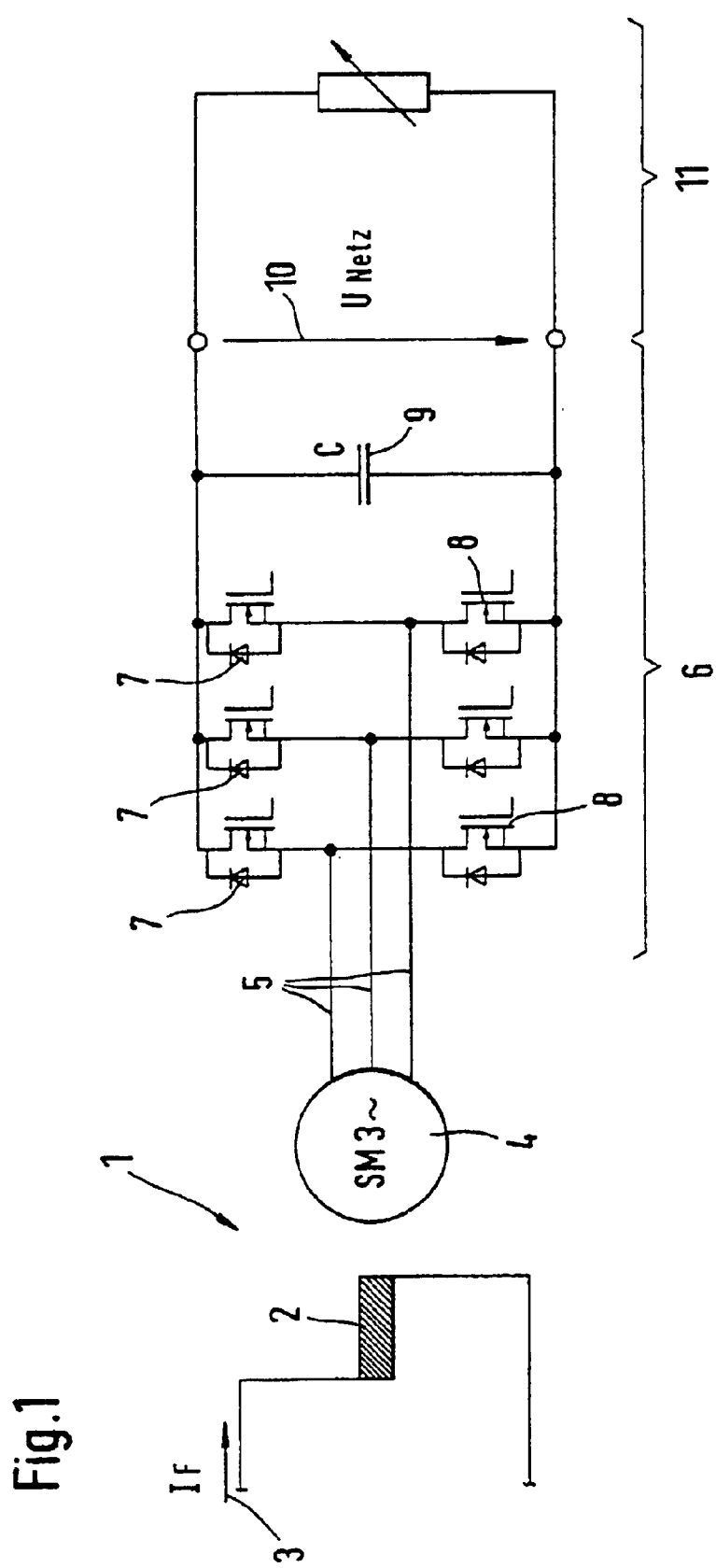
FIG. 1 shows a schematic configuration of an electrical machine having downstream pulse-width modulation inverter.

FIG. 1 shows a schematic configuration of an electrical machine having downstream pulse-width modulation inverter.

An electrical machine 1 comprises an excitation winding 2 in which an exciting current 3 flows, also labelled "$i_F$". Moreover, a stator winding 4 that, depending on the design of the electrical machine 1, can comprise more or fewer winding coils $w_1$ or $w_2$. The stator winding 4 of the electrical machine 1 operable in the generator mode is connected to a converter bridge 6 via its terminal connections 5. The converter bridge 6—designed as a pulse-width modulation inverter—contains a number of switches that are represented here as field effect transistors having backward diodes, 7, 8, and a capacitor 9. The voltage difference between the machine terminals 5 and the voltage $u_{Netz}$ in the vehicle electrical system of a motor vehicle can be compensated for via the pulse-width modulation inverter 6. The load 11, which represents the electrical equipment in the vehicle electrical system of a motor vehicle, is indicated via an adjustable ohmic resistance.

Figure 2:
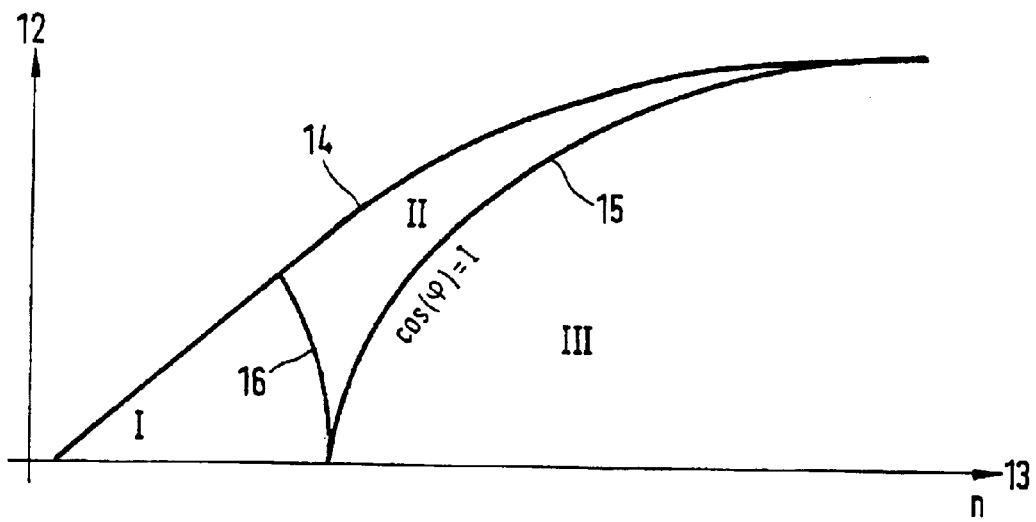
FIG. 2 shows the control ranges of the electrical machine, limited by the course of power limit, power factor cos φ, and voltage limit.

FIG. 2 shows the control ranges of an electrical machine 1, each of which is limited by the course of power limit, voltage limit, and the course of the power factor cos φ.

The control range—labelled "I"—of an electrical machine 1 is determined, on the one hand, by the voltage limit 16 and, on the other hand, by a section of the torque line 29. In this control range, the terminal voltage of the electrical machine 1 does not yet reach the maximum possible output voltage of the converter 6. The maximum efficiency of the machine is reached when the minimal current flows in the stator 4 at a constant power output. If the magnetic uniaxiality of a claw-pole alternator is neglected at first, this is achieved when a pure cross current flows in the stator winding and the direct-axis current becomes zero. In the control range I, the converter 6 has not yet reached its voltage limit, and it can set the desired stator current. The exciting current 3 is set to its maximum value, so that a minimum of stator current in the stator winding is required for the output required. The losses in the stator winding 4 exceed the excitation losses by far, so it is favorable to increase the excitation current 3 to the maximum value and minimize the stator current in order to optimize the efficiency. The maximum torque of the electrical machine 1 is restricted by the maximum stator current. The electrical power 12 output by the electrical machine 1 increases in linear fashion with the speed 13.

The control range II—shown in FIG. 2—of an electrical machine is limited at the top by the course of the power curve and at the bottom by the course of the power factor cos φ, reference numeral 15. The control range II corresponds to the range of field weakening and is achieved when the machine voltage of the electrical machine 1 has reached the ceiling voltage of the converter 6. Then, the converter 6 cannot increase the voltage any further. A range of field weakening is realized by means of a direct-axis current occurring in the electrical machine 1. The exciting current $i_F$ in the excitation winding 2 of the electrical machine 1 remains set at its maximum value in order to realize a minimal stator current in the stator winding 4, so that the losses occurring there are minimized.

The control range III according to FIG. 2 is restricted by the course of the power factor cos φ (reference numeral 15) and the course of the speed axis 13. If the direct-axis current in the electrical machine 1 reaches a value at which the power factor cos φ of the electrical machine 1 has reached the value cos φ=−1, a change in the control structure is favorable. Although the control range II of the electrical machine 1 could be continued much further to higher speeds, better efficiency is achieved when the exciting current of the electrical machine 1, $i_F$ is reduced.

Under the basic condition of a constant terminal voltage at the electrical machine, the efficiency reaches a maximum when the power factor 15 reaches the value 1 (or −1). Current and voltage are then in phase and, for the case of constant nominal voltage (i.e., ceiling voltage of the converter), the phase current is lowest and, therefore, so are the losses that occur there. This operating state corresponds to an electrical machine 1 having a downstream diode bridge operated in the generator mode. The regulation of the output electrical power 12 takes place via the regulation of the exciting current 3. The basic condition of a maximum terminal voltage at cos φ=−1 is fulfilled by the rectifier bridge.

Figure 3:
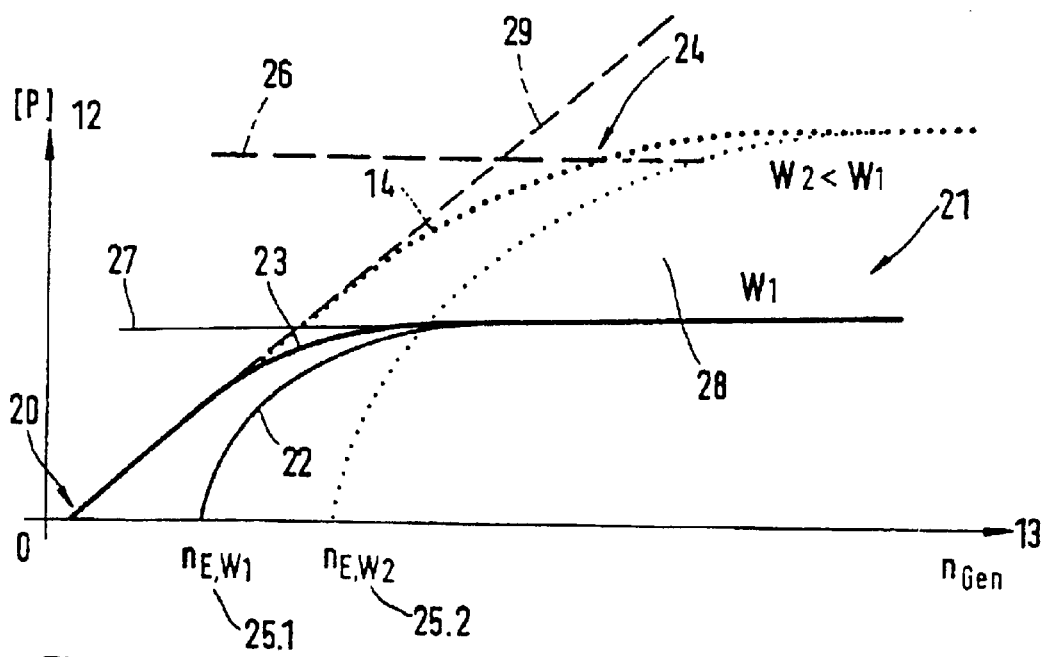
FIG. 3 shows the courses of power curves for electrical machines having different numbers of coils, plotted against speed.

FIG. 3 shows the course of the power curves for electrical machines having different numbers of coils $w_1$ or $w_2$, each plotted against the speeds of the internal combustion engine or the electrical machine operable in the generator mode.

Two speed values 25.1 are plotted on the axis representing the courses of speed. One of the speed values corresponds to a first inception speed in the diode mode of an electrical machine 1 having a number of coils $w_1$, and a second inception speed 25.2 for a second electrical machine having a second speed $w_2$. An inception speed that applies for both generator designs (number of coils $w_1$ and number of coils $w_2$) having a pulse-width modulating inverter is plotted with reference numeral 20. Different courses of the output 12 of electrical power result for the two electrical machines 1 operable at one pulse-width modulation inverter 6, which electrical machines 1 are presented in comparison to each other in the diagram according to FIG. 3 with different numbers of coils for the stator winding 4.

The torque line 29, which reflects a linear relationship between speed and output electrical power, has its origin in the vicinity of the origin of the coordinate system comprising the axes 12 and 13. For a low speed range, the course of the torque line 29 is identical to the course of the power limit 14, which, extending as asymptote at higher speeds, deviates from the course of the torque line 29.

The course of the curve labelled with reference numeral 23 represents the course of the power output of an electrical machine 1 having a larger number of coils $w_1$, while the course of the curve 24 illustrated using the dotted line represents the course of the power output of an electrical machine 1 having a number of coils $w_2$ that is lower compared to $w_1$. The course of the power output of an electrical machine 1 in the diode mode is illustrated by reference numeral 22. Based on the course of the characteristic line in the diode mode of the electrical machine 1, it becomes apparent that the output of electrical power drops off drastically in the range of idle speed of an internal combustion engine, so that the use of a generator having such a characteristic line in motor vehicles is impossible.

In contrast, from the diagram according to FIG. 3, one can derive that the course of the output of electrical power 12 according to the course of the curve 23—which represents the power output during operation of an electrical machine 1 using a pulse-width modulation inverter—also allows for the allocation of a pulse-width modulation inverter to an electrical machine 1 a sufficient power output 12 of an electrical machine 1 corresponding to the torque line 29 even in the idle range up to close to the origin of the diagram up to the inception speed 20. The output of electrical power can be held in this range via the converter bridge 6 independently of the number of coils $w_1$ or $w_2$, i.e., independently of the further course of the curves 23 or 24, which deviate from each other considerably at higher speeds.

For the lower speeds represented according to FIG. 3, e.g., between the speeds 20 and 25.2, the pulse-width modulation inverter 6 must be able to process a machine current that is inversely proportional to the numbers of coils $w_1$ or $w_2$ of the stator winding 4. This means that a larger pulse-width modulation inverter 6 is required for stator windings 4 having a smaller number of coils $w_2$. The slot electrical loading of the electrical machine 1 is identical for both windings having different numbers of coils $w_1$ and $w_2$.

The following can be derived from the comparison of the power limits 23 and 24 for electrical machines 1 having different numbers of stator windings $w_1$ and $w_2$: On the one hand, the inception speed of an electrical machine 1 in the generator mode having a small number of stator windings $w_2$ at the diode rectifier 25.2 is quite high compared to the inception speed of an electrical machine for generator operation having an inception speed 25.1.

On the other hand, the power output $P_{max}$, indicated by reference numeral 26, is much higher for an electrical machine having a smaller number of coils $w_2$ than for an electrical machine 1, the stator winding 4 of which comprises a larger number of coils $w_1$. The power output 27 $P_{max,\ w1-w2}$ is much lower at higher speeds, compared with the maximum 26 $P_{max,\ w2}$ of an electrical machine 1 having a stator winding 4 comprising fewer coils $w_2$.

An electrical machine 1 in the generator mode having a smaller number of stator windings $w_2$ is therefore not fully utilized in terms of its performance in the upper speed range. It only needs to cover the power requirement of the vehicle electrical system of a motor vehicle. Due to the smaller number of coils of the stator winding 4, the slot electrical loading and, therefore, the stator copper losses that occur, are much lower in such an electrical machine 1 than in an electrical machine 1 having a number of coils $w_1$. In the electrical machine 1 having a smaller number of stator windings, a magnetic flux that is correspondingly greater occurs. This flux leads to greater losses in the iron region of the electrical machine 1. In the claw-pole machines of today, however, the current-dependent copper losses in the stator winding and the harmonic losses in the machine outweigh the losses mentioned hereinabove from the magnetic fundamental wave field.

By operating an electrical machine 1 in the generator mode, the number of coils in the stator winding can be selected more freely by operating the electrical machine using a pulse-width modulation inverter 6. The converter 6 in the form of a pulse-width modulation inverter always makes the power output 12 along the torque line 29 possible in the lower speed range. This is independent of the number of coils $w_1$ or $w_2$ of the electrical machine 1 selected in the respective case. Currents that behave inversely proportional to the number of coils are then to be processed in the pulse-width modulation inverter.

In the upper speed range, i.e., in a speed range above the inception speed 25.2 on the speed axis 13 according ot the representation in FIG. 3, using a smaller number of coils $w_2$ brings about a considerable improvement in either the power output 12 or efficiency of the electrical machine. When a stator winding having a smaller number of coils $w_2$ is used, correspondingly lower slot electrical loadings result in the upper speed range. Provided that the same slot space factor is given as with an electrical machine 1 having a larger number of coils $w_1$, markedly smaller losses therefore result in the winding copper. Moreover, the iron losses caused by the slot electrical loading are reduced. As a result, a type of machine winding designed having fewer coils can be dimensioned for minimal total losses in one driving schedule. Accordingly, a reduction in the number of coils of an electrical machine 1 operated in the generator mode leads to improved efficiency in the total system, although it must be noted that field effect transistors must be designed stronger, which, however, are also correspondingly easier to regulate by means of a stronger design.

Reference Numerals

1 Electrical machine
2 Excitation winding
Exciting current $i_F$
4 Stator winding
5 Terminal connections
6 Converter
7 Diodes
8 Switching valves
9 Capacitor
10 Nominal voltage
11 Load
12 Electrical power output
13 Speed
14 Course of power limit
15 Course of power factor for $\cos \phi = 1$
16 Voltage limit
17 Control range I
18 Control range II
19 Control range III
20 Idle speed
21 Power curve for larger number of coils $w_1$
22 Operation using diode bridge
23 Power limit of converter mode
24 Power curve of smaller number of coils $w_2$
25.1 Inception speed $n_{w1}$
25.2 Inception speed $n_{w2}$
26 Maximum power at $w_2$
27 Maximum power at $w_1$
28 Power reserve
29 Torque line

What is claimed is:

1. A method for operating an electrical machine (1) for an output of electrical power (12) comprising an excitation winding (2) and a stator winding (4), wherein a converter configuration is located downstream of the electrical machine, wherein, in a range of an idle speed of an internal combustion engine, the output of electrical power (12) takes place along a torque line (29) independently of a number of coils $w_1$, $w_2$ and, in a speed range above the idle speed of the internal combustion engine, the output of electrical power (12) takes place via an electrical machine (1) having a stator winding (4) comprising a small number of coils $w_2$, wherein a voltage difference between a vehicle electrical system (10) of a motor vehicle and machine terminals (5) is compensated for by means of a pulse-width modulation inverter (6), wherein the pulse-width modulation inverter is configured to include semi-conductor components arranged in parallel to one-way diodes, thereby enabling operation of the engine over an entire range of operation.

2. The method according to claim 1, wherein, in the idle speed range of the internal combustion engine, the power output (12) of the electrical machine (1) takes place via a configuration of the pulse-width modulation inverter (6).

3. The method according to claim 1, wherein the pulse-width modulation inverter (6) processes a current that is inversely proportional to the number of coils of the stator winding (4) of the electrical machine (1).

4. The method according to claim 1, wherein the output of electrical power (12) above the idle speed range takes place according to a power curve (24) of an electrical machine (1) having a small number of coils $w_2$.

5. The method according to claim 1, wherein by operating the electrical machine (1) using a pulse-width modulation inverter (6), the number of stator windings can be selected independently of an inception speed (25.1, 25.2).

6. The method according to claim 1, wherein, in a speed range below the idle speed range, the output of electrical power (12) takes place up to a maximum value (27) according to the torque line (29) via the pulse-width modulation inverter (6).

7. The method according to claim 1, wherein an average efficiency of the electrical machine (1) is increased by outfitting the electrical machine (1) with a selectively minimal number of coils $w_2$.

* * * * *